United States Patent
Malone

[11] Patent Number: 6,056,020
[45] Date of Patent: May 2, 2000

[54] SNAP TOGETHER CORE AND CONDUIT

[75] Inventor: David S. Malone, Attica, Mich.

[73] Assignee: Teleflex Incorporated, Plymouth Meeting, Pa.

[21] Appl. No.: 09/236,719

[22] Filed: Jan. 25, 1999

[51] Int. Cl.[7] ........................................... F16L 9/22
[52] U.S. Cl. ..................... 138/155; 138/109; 285/314; 403/287; 74/502.4
[58] Field of Search ........................... 138/155, 120, 138/109, 114, 111; 285/69, 314, 305; 74/502.5, 502.6, 502.4; 403/287, 316

[56] References Cited

U.S. PATENT DOCUMENTS

| | | | |
|---|---|---|---|
| 3,528,312 | 9/1970 | Nielsen | 74/501 |
| 4,682,513 | 7/1987 | Reeder | 206/223 |
| 4,854,185 | 8/1989 | Lichtenberg et al. | 74/501.5 R |
| 4,917,418 | 4/1990 | Gokee | 292/125 |
| 5,002,315 | 3/1991 | Bartholomew | 285/93 |
| 5,039,138 | 8/1991 | Dickirson | 285/314 |
| 5,536,103 | 7/1996 | Sawada | 403/326 |
| 5,664,462 | 9/1997 | Reasoner | 74/502.4 |

Primary Examiner—Patrick Brinson
Attorney, Agent, or Firm—Howard & Howard

[57] ABSTRACT

A first conduit section (12) has a first end fitting (16) at an inner end thereof and a second conduit section (14) has a second end fitting (18) at an inner end thereof. A first end fitting (20) is movably supported by the first conduit section (12) and has a first terminal (28) adjacent the first end fitting (16). Likewise, a second core element (24) is movably supported by the second conduit section (14) and has a second terminal (30) adjacent the second end fitting (18). The terminals (28 and 30) include male and female portions for snapping the terminals (28 and 30) into mechanical interlocking engagement with one another and a coupling mechanism (36) couples the end fittings (16 and 18) together. The assembly is characterized by a connection mechanism for forcing the terminals (28 and 30) into the mechanical interlocking engagement with one another and thereafter releasing the terminals (28 and 30) for rectilinear movement in response to coupling the end fittings (16 and 18) together. The connection mechanism includes a pair of positioning arms (38) having a holding position for holding the second terminal (30) spaced from an inward limit of movement as the terminals (28 and 30) are forced into the mechanical interlocking engagement with one another and a release position for allowing the engaged terminals (28 and 30) to move between limits of movement.

17 Claims, 2 Drawing Sheets

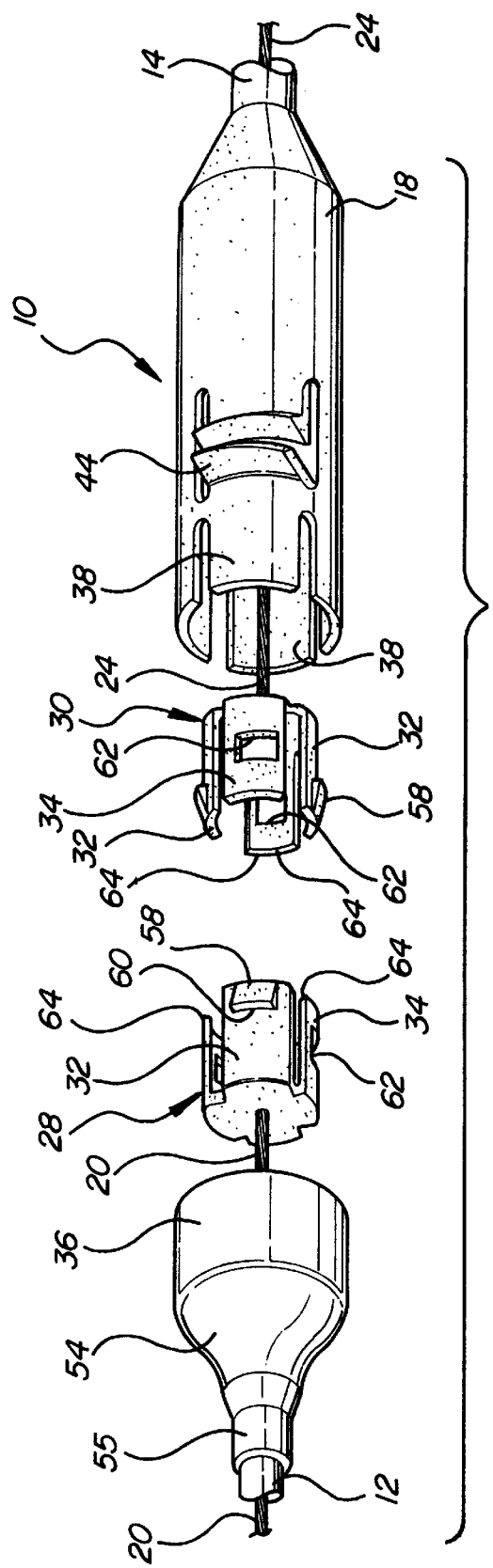
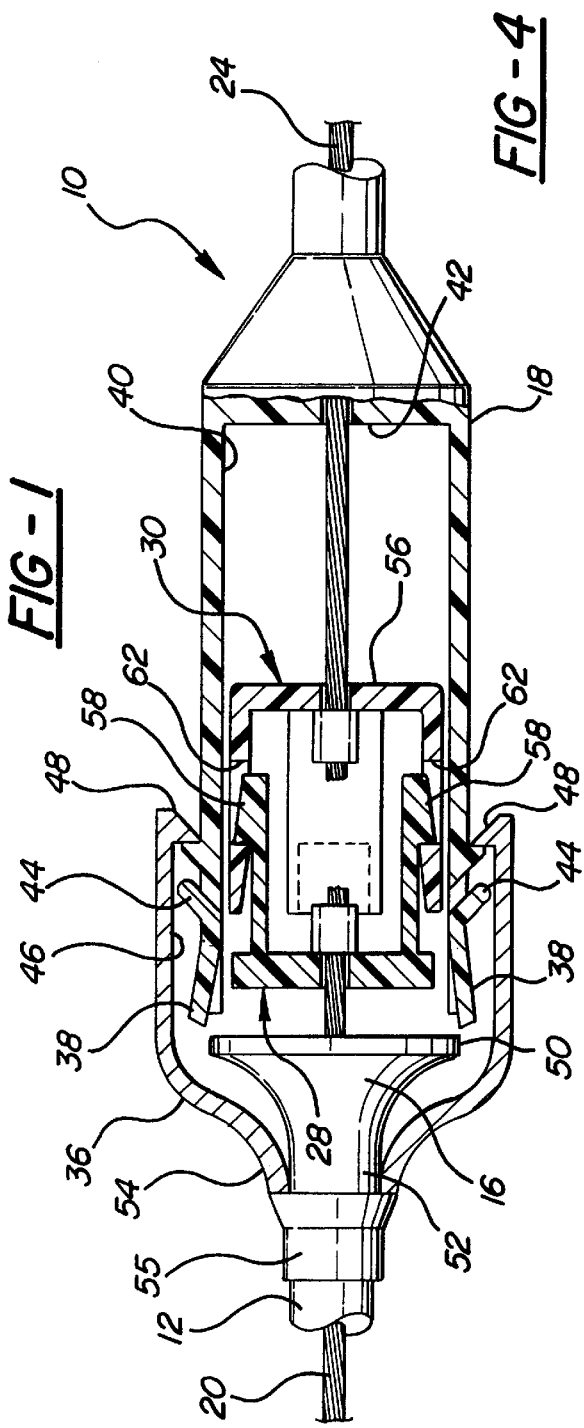

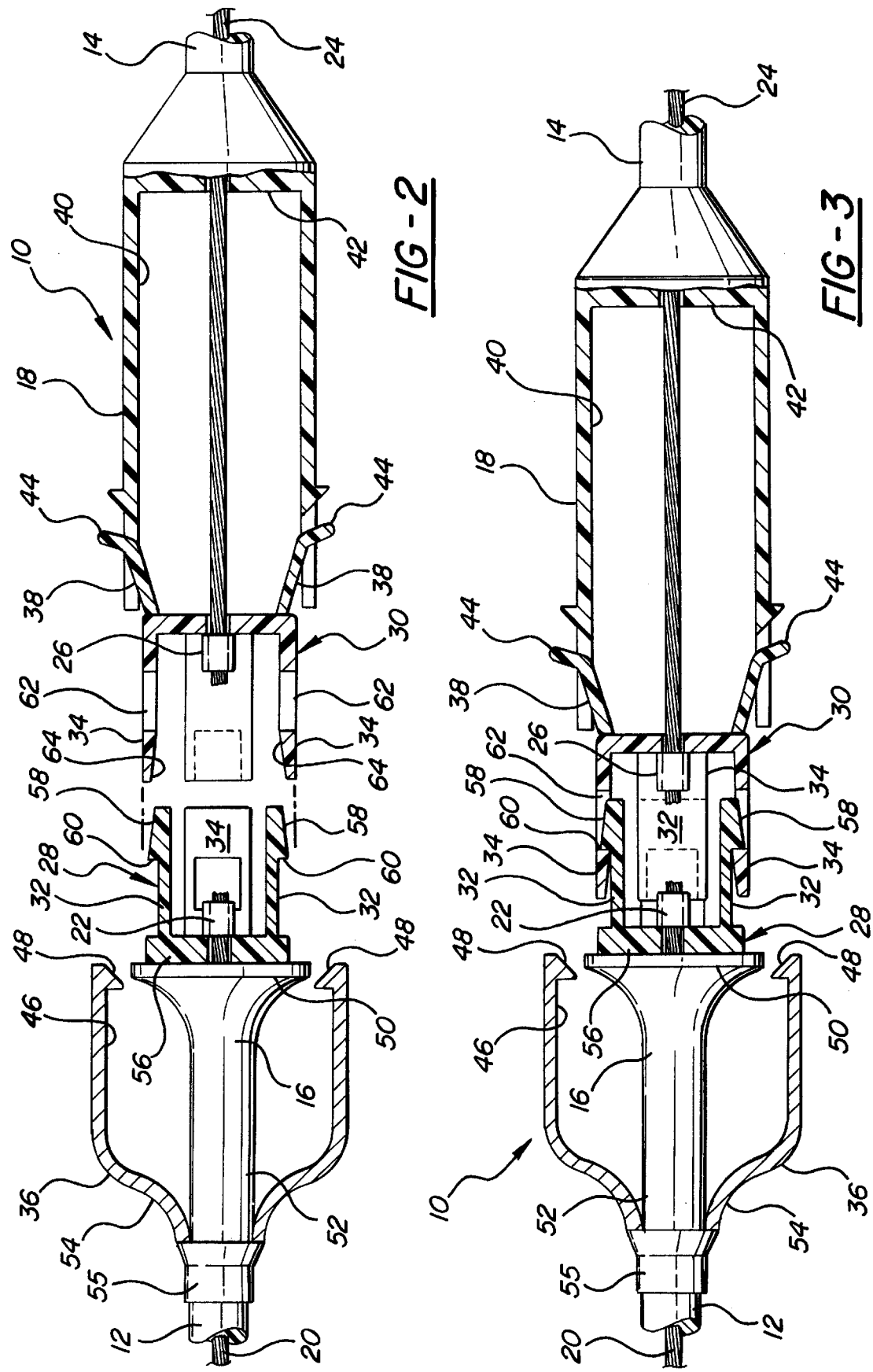

SNAP TOGETHER CORE AND CONDUIT

BACKGROUND OF THE INVENTION

1. Field of the Invention

The subject invention relates to a motion transmitting remote control assembly of the type for transmitting motion in a curved path by a flexible motion transmitting core element.

2. Description of the Prior Art

The motion transmitting remote control assemblies of the type to which the subject invention pertains comprising first and second conduit sections respectively extending between inner and outward ends with end fittings at the respective inner ends and a coupling mechanism for coupling the end fittings together. A first core element is movably supported by the first conduit section and has a first terminal end adjacent the first end fitting. A second core element is movably supported by the second conduit section and has a second terminal end adjacent the second end fitting. The terminals include male and female portions for connection the terminals into mechanical interlocking engagement with one another. A coupling mechanism couples the end fittings together after the core element terminals are connected together.

Typical of such assemblies is that disclosed in U.S. Pat. No. 5,039,138 to Dickirson. The terminals are forced together as one terminal is held against linear movement by an indexing pin which interconnects the end fitting and the terminal but which must be manually removed once the core element terminals are connected. In addition, in Dickirson, the indexing pin may remain in position preventing relative movement of the terminal even after the fittings are coupled together. This, of course, presents a problem of the control assembly being left in an inoperative position after installation.

SUMMARY OF THE INVENTION AND ADVANTAGES

A motion transmitting remote control assembly comprising first and second conduit sections respectively extending between inner and outward ends with end fittings at the respective inner ends and a coupling mechanism for coupling the end fittings together. A first core element is movably supported by the first conduit section and has a first terminal end adjacent the first end fitting. A second core element is movably supported by the second conduit section and has a second terminal end adjacent the second end fitting. The terminals include male and female portions for snapping the terminals after which a coupling mechanism couples the end fittings of the conduits together into mechanical interlocking engagement with one another. The assembly is characterized by a connection mechanism for forcing the terminals into the mechanical interlocking engagement with one another and thereafter automatically releasing the terminals for rectilinear movement in response and as a pre-condition to coupling the end fittings together.

BRIEF DESCRIPTION OF THE DRAWINGS

Accordingly, the subject invention provides such a remote control assembly wherein the components of the assembly itself positively release the core element terminal as a result of and in positive response to the fittings being coupled together. Therefore, the assembly can not be totally assembled without releasing the terminals of the core elements for longitude movement.

Other advantages of the present invention will be readily appreciated as the same becomes better understood by reference to the following detailed description when considered in connection with the accompanying drawings wherein:

FIG. 1 is a perspective view showing the assembly in the preassembled condition;

FIG. 2 is a cross sectional view showing the assembly positioned for assembly;

FIG. 3 is a cross sectional view showing the assembly partially assembled with the terminals of the core elements snapped together; and FIG. 4 is a cross sectional view showing the assembly fully assembled with the end fittings coupled together.

DESCRIPTION OF THE PREFERRED EMBODIMENT

Referring to the Figures, wherein like numerals indicate like or corresponding parts throughout the several views, a motion transmitting remote control assembly constructed in accordance with the subject invention is generally shown at 10.

As is well known in the art, the assembly 10 comprises first and second conduit sections 12 and 14 respectively extending between inner and outward ends. The outward ends are cutoff and the inner ends have first and second end fittings 16 and 18 disposed thereon, as by being molded of organic polymeric or plastic material about the respective conduit sections 12 and 14. In other words, the first conduit section 12 has a first end fitting 16 disposed at the inner end thereof and the second conduit section 14 has a second end fitting 18 disposed at the inner end thereof The conduits typically comprise of an inner tubular liner of organic polymeric material surrounded by a complement of long lay wires helically wound thereabout and encased in a tubular casing of extruded organic polymeric material.

A first core element 20 is movably supported by the first conduit section 12 and has a first slug 22 secured thereto adjacent the first end fitting 16. A second core element 24 is movably supported by the second conduit section 14 and has a second slug 26 secured thereto adjacent the second end fitting 18. The core elements 20 and 24 consist of a wire or filaments woven together and flexible. A first terminal, generally indicated at 28, is retained on the first core element by the first slug 22 and a second terminal, generally indicated at 30, is retained on the second core element 24 by the second slug 22. As will described more specifically hereinafter, the terminals 28 and 30 include male 32 and female 34 portions or fingers for snapping the terminals 28 and 30 into mechanical interlocking engagement with one another.

A coupling mechanism 36 is movably supported by the first end fitting 16 for coupling the end fittings 16 and 18 together and comprises an annular cover for surrounding the end fittings 16 and 18.

As shown in FIG. 2, the first end fitting 16 abuts the first terminal 28 to establish a first limit of movement of the first end fitting 20 into or relative to the first conduit section 12.

The assembly 10 is characterized by a connection mechanism for forcing the terminals 28 and 30 into mechanical interlocking engagement with one another and thereafter releasing the terminals 28 and 30 for rectilinear movement in response to coupling the end fittings 16 and 18 together. More specifically, the connection mechanism includes a plurality of positioning arms 38 having a holding position (FIG. 2) for holding the second terminal 30 spaced from a second limit of movement as the terminals 28 and 30 are forced into the mechanical interlocking engagement with one another and a release position (FIG. 4) for allowing the engaged terminals 28 and 30 to move between the first and second limits of movement. The second end fitting 18 defines a guideway 40 for movably supporting the terminals 28 and 30 when in the mechanical interlocking engagement with one another and establishing a second limit of movement of the second core element 24 into the second conduit section 14, i.e., by abutting the bottom 42 of the guideway 40. The end fittings 16 and 18 abut one another when coupled together and the coupling mechanism 36 interconnects the end fittings 16 and 18 to retain the end fittings 16 and 18 coupled together and in the abutting relationship.

As best viewed in FIG. 2, each arm 38 extends from the second end fitting 18 inwardly into the guideway 40 thereof and includes a lever 44 extending outwardly from the second fitting 18. As best viewed in FIG. 4, the coupling cover 36 includes an inner surface 46 for engaging and forcing the levers 44 inwardly to pivot the arm 38 outwardly out of engagement with the second terminal 30 to allow the second terminal 30 to move toward the second limit of movement. Each lever 44 has a distal or outward end and the coupling cover 36 includes a catch 48 for ramping or pivoting the lever 44 inwardly and for catching over the lever 44 to couple the end fittings 16 and 18 together. Therefore, the coupling mechanism 36 is for moving the arms 38 to the release position as well as coupling the end fittings 16 and 18 together.

The first end fitting 16 includes a head 50 and a neck 52. The head 50 is circular and abuts the first terminal 28 to establish the first limit of movement. To couple the end fittings 16 and 18 together, the catch 48 moves over the head 50 and ramps over the lever 44 and into the coupled position shown in FIG. 4. The coupling cover 36, in addition to including the catch 48, also includes a retaining portion 54 slidably supported on the neck 52 for engaging the head 50 when in the coupled position. The neck 52 includes a collar 55 against which the end of the neck 52 abuts to limit longitudinal movement relative to the first conduit 12.

The terminals 28 and 30 are identical and each comprises a base 56 with the fingers 32 and 34 extending from the base 56. The slugs 22 and 26 engage the base 56 of the terminals 28 and 30 to retain the terminals 28 and 30 on the respective core elements. The fingers 32 and 34 of the first terminal 28 extend toward the fingers 32 and 34 of the second terminal 30 to define male and female portions of the terminals 28 and 30 whereby the male fingers 32 of the terminals 28 and 30 snap into engagement with the female fingers 34 of the other of the terminals 28 and 30. To facilitate this snap together sequence, the male fingers 32 each have a distal end presenting an outward taper 58 leading to a shoulder 60 and the female fingers 34 each present an opening 62 for receiving the distal end and locking the shoulder 60 in the opening 62. In addition, the female fingers 34 have a distal end presenting an inward bevel 64 leading to said opening 62.

The connection mechanism may include a plurality of the arms 38 and levers 44 but as illustrated, there are two pair of arms 38 and levers 44 disposed diametrically opposite to one another. Also, the terminals 28 and 30 are identical and each include two each of the male 32 and female 34 fingers.

The invention has been described in an illustrative manner, and it is to be is understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A motion transmitting remote control assembly comprising;

first and second conduit sections (12 and 14) respectively extending between inner and outward ends, said first conduit section (12) having a first end fitting (16) at said inner end thereof, said second conduit section (14) having a second end fitting (18) at said inner end thereof, a first core element (20) movably supported by said first conduit section (12) and having a first terminal (28) adjacent said first end fitting (16), a second core element (24) movably supported by said second conduit section (14) and having a second terminal (30) adjacent said second end fitting (18), and said terminals (28 and 30) including male and female portions for snapping said terminals (28 and 30) into mechanical interlocking engagement with one another, a coupling mechanism (36) for coupling said end fittings (16 and 18) together, said assembly characterized by a connection mechanism movable between a holding position engaging one of said terminals for forcing said terminals (28 and 30) into said mechanical interlocking engagement with one another and a disengaged position for automatically and positively releasing said terminals (28 and 30) for rectilinear movement in response and as a precondition to coupling said end fittings (16 and 18) together.

2. An assembly as set forth in claim 1 wherein said first end fitting (16) abuts said first terminal (28) to establish a first limit of movement of said first end fitting (20) into said first conduit section (12).

3. An assembly as set forth in claim 2 wherein said second end fitting (18) defines a guideway (40) for movably supporting said terminals (28 and 30) when in said mechanical interlocking engagement with one another and establishing a second limit of movement of said second core element (24) into said second conduit section (14).

4. An assembly as set forth in claim 3 wherein said connection mechanism includes at least one positioning arm (38) having said holding position for engaging and holding said second terminal (30) spaced from said second limit of movement as said terminals (28) and (30) are forced into said mechanical interlocking engagement with one another and a release position for allowing said engaged terminals (28 and 30) to move between said first and second limits of movement.

5. An assembly as set forth in claim 4 wherein said coupling mechanism (36) is movably supported by said first end fitting (16) for moving said arm (38) to said release position.

6. An assembly as set forth in claim 5 wherein said end fittings (16) and (18) abut one another when coupled together and said coupling mechanism (36) interconnects said end fittings (16 and 18) to retain said end fittings (16 and 18) coupled together and in said abutting relationship.

7. An assembly as set forth in claim 6 wherein said arm (38) extends from said second end fitting (18) inwardly into said guideway (40) thereof and includes a lever (44) extending outwardly from said second end fitting (18), said coupling mechanism (36) including an inner surface (46) for engaging and forcing said lever (44) inwardly to pivot said arm (38) to said disengaged position outwardly out of engagement with said second terminal (30) to allow said second terminal (30) to move toward said second limit of movement.

8. An assembly as set forth in claim 7 wherein said lever (44) has a distal end and said coupling mechanism (36) includes a catch (48) for ramping said lever (44) inwardly and for catching over said lever (44) to couple said end fittings (16) and (18) together.

9. An assembly as set forth in claim 8 wherein said first end fitting (16) includes a head (50) and a neck (52), said head (50) abuts said first terminal (28) to establish said first limit of movement, said coupling mechanism (36) includes a catch (48) for moving over said head (50) and ramping over said lever (44) into said coupled position and a retaining portion (54) slidably supported on said neck (52) for engaging said head (50) when in said coupled position.

10. An assembly as set forth in claim 9 wherein said coupling mechanism (36) comprises an annular cover for surrounding said end fittings (16 and 18) and said connection mechanism includes a plurality of said arms (38) and levers (44).

11. An assembly as set forth in claim 10 wherein said terminals (28 and 30) are identical.

12. An assembly as set forth in claim 10 wherein each of said terminals (28) and (30) comprises a base (56) and fingers (32 and 34) extending from said base (56), said fingers (32 and 34) of said first terminal (28) extending toward said fingers (32 and 34) of said second terminal (30), said male and female portions of said terminals (28 and 30) being defined by said fingers (32 and 34).

13. An assembly as set forth in claim 12 wherein each terminal includes at least one male portion defined by a male finger (32) and at least one female portion defined by a female finger (34) whereby said male fingers (32) of said terminals (28 and 30) snap into engagement with the female fingers (34) of the other of said terminals (28 and 30).

14. An assembly as set forth in claim 13 wherein said terminals (28 and 30) are identical and each include two each of said male (32) and female (34) fingers.

15. An assembly as set forth in claim 14 wherein said core elements include first (22) and second (26) a slugs secured thereto to engage said base (56) of said terminals (28 and 30) to retain said terminals (28 and 30) on said respective core elements.

16. An assembly as set forth in claim 13 wherein said male fingers (32) have a distal end presenting an outward taper (58) leading to a shoulder (60) and said female fingers (34) present an opening (62) for receiving said distal end and locking said shoulder (60) in said opening (62).

17. An assembly as set forth in claim 16 wherein said female fingers (34) have a distal end presenting an inward bevel (64) leading to said opening (62).

* * * * *